July 2, 1940.  J. J. DUGAS, JR  2,206,771
OPERATING VALVE FOR VACUUM SYSTEMS FOR CONTROLLING MARINE CLUTCHES
Filed Nov. 24, 1939   2 Sheets-Sheet 2
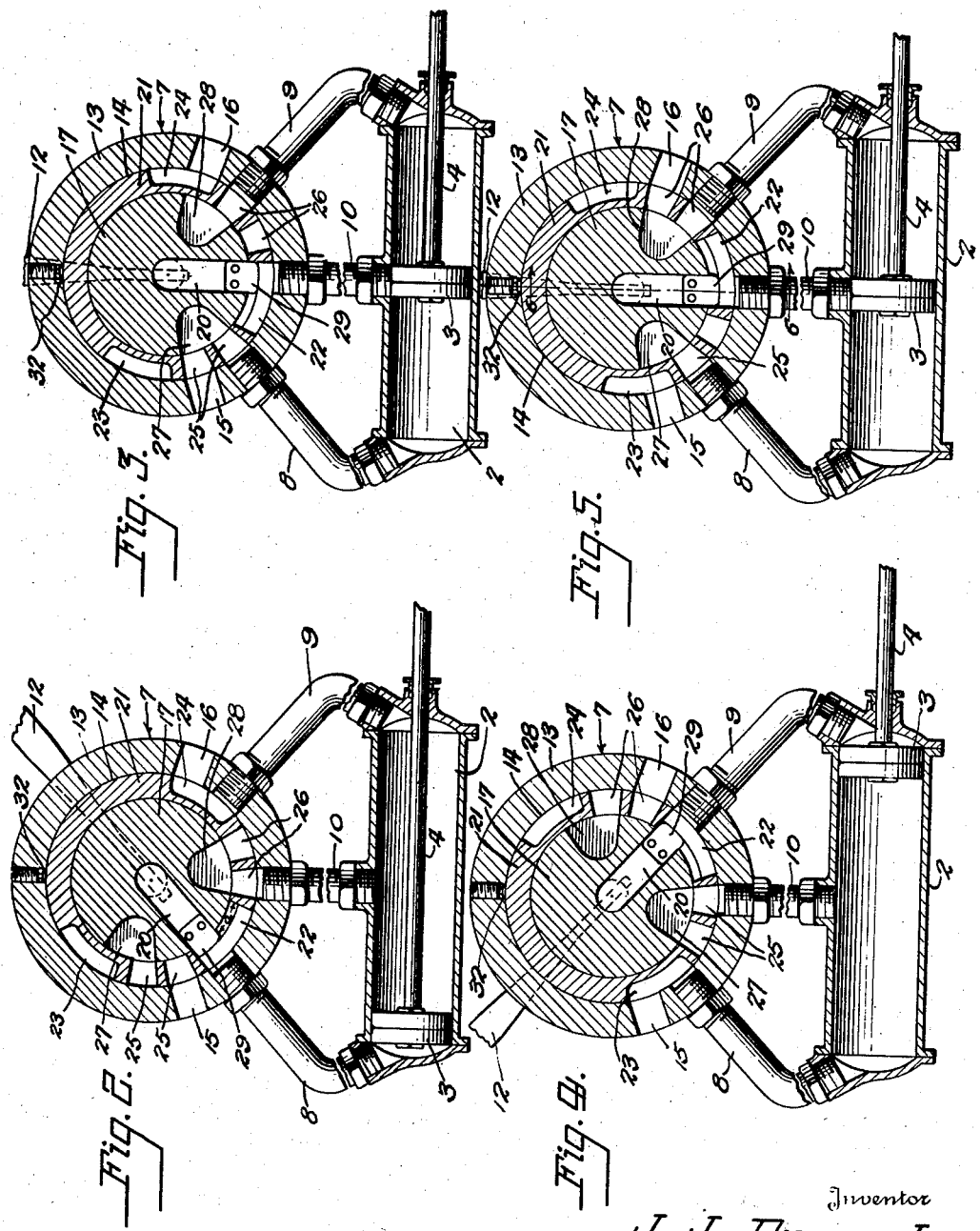
Inventor
J. J. Dugas, Jr.
By Mason Fenwick & Lawrence
Attorneys Patented July 2, 1940

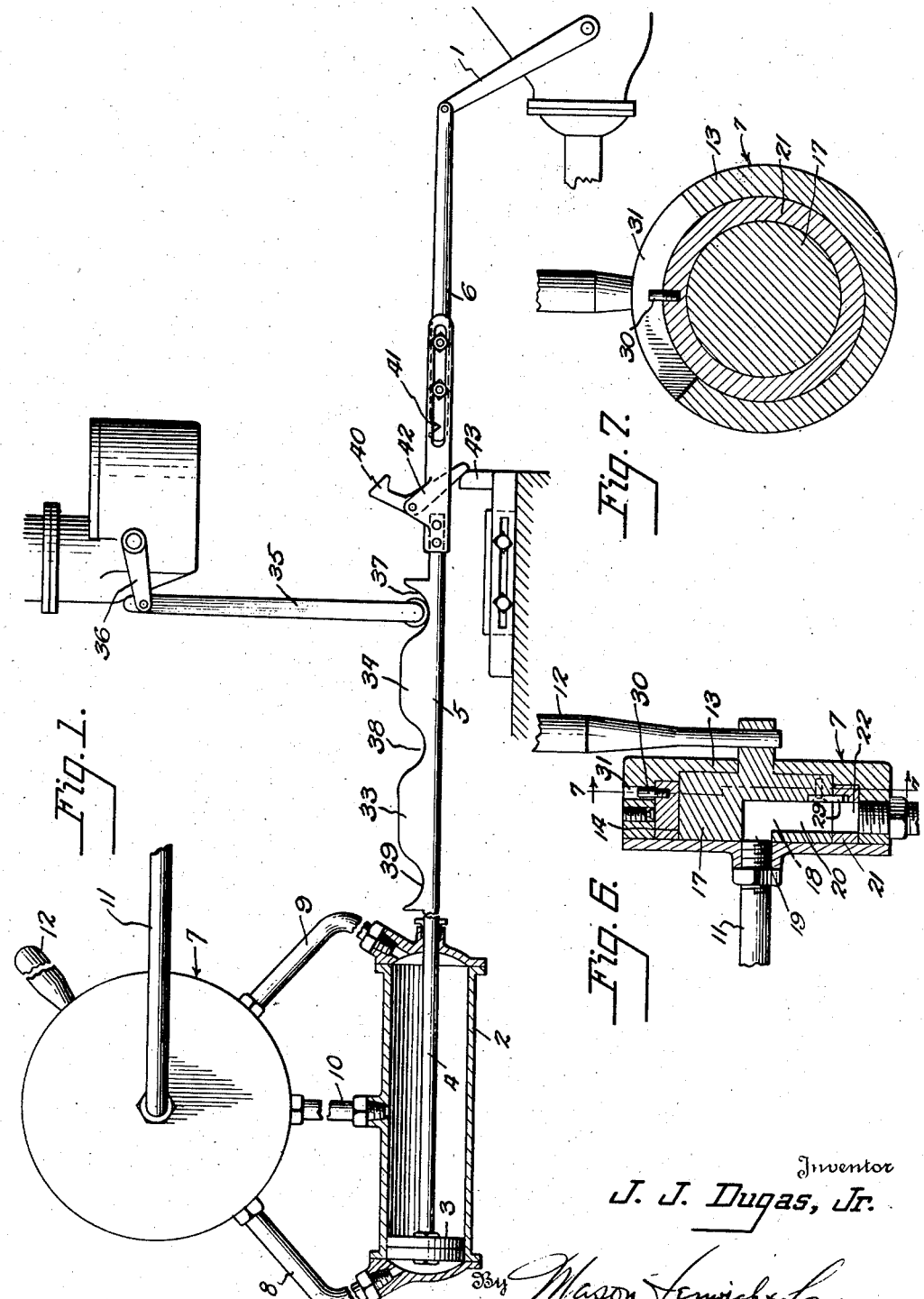

2,206,771

UNITED STATES PATENT OFFICE 2,206,771

OPERATING VALVE FOR VACUUM SYSTEMS FOR CONTROLLING MARINE CLUTCHES

Joseph J. Dugas, Jr., New Orleans, La.

Application November 24, 1939, Serial No. 306,015

4 Claims. (Cl. 192—86)

This invention relates to a vacuum clutch control for motor boat power plants, including the control valve therefor.

One of the objects of the invention is the provision of a vacuum clutch operating system which shall positively couple the clutch, both for forward and reverse directions of travel. It is, of course, familiar to those conversant with the requirements of marine propulsion that the clutch of a motor boat is in the line of direct drive from the engine, both in the reverse direction as well as forward, without the intermediary of transmission mechanism such as is common in an automobile power plant, for the boat clutch, in reverse, is employed as a brake, and the power ratio therefor must be the same or nearly the same as that of forward drive. In an automobile, the clutch is positively operated always in one and the same direction, the reversing gear of the transmission mechanism being depended upon to drive the car in a backward direction, and that at a gear ratio much reduced below that of direct drive.

Another object of the invention is to provide a control valve for the vacuum system, the handle of which shall have a definite forward, reverse and neutral position, and being preferably so arranged that when in its forward and reverse positions it is directed respectively toward the bow and stern of the boat, and movable to operate the valve, by a single sweep in the direction in which it is desired that the boat shall travel.

Other objects of the invention will appear as the following description of a preferred and practical embodiment thereof proceeds:

In the drawings which accompany and form a part of the following specification, and throughout the several figures of which the same characters of reference have been employed to designate identical parts:

Figure 1 is a longitudinal elevation, largely diagrammatic, illustrating a vacuum clutch operating system with control valve therefor embodying the principles of the invention;

Figures 2, 3, 4 and 5 are vertical sections through the control and vacuum cylinder, respectively, in positions of forward, neutral after forward, reverse, and neutral after reverse.

Figure 6 is an axial cross-section through the control valve, taken along the line 6—6 of Figure 5; and Figure 7 is a cross-section taken along the line 7—7 of Figure 6.

Now referring in detail to the several figures, the numeral 1 represents the clutch lever which may be thrown to the angular position shown, in which the clutch is positively connected for forward drive, or thrown to an opposite position, not shown, in which the clutch is positively actuated in the opposite or reverse direction. The vacuum motor for operating the clutch comprises the cylinder 2, having a piston 3 and piston rod 4, which through the links 5 and 6 transmits operative movement to the clutch lever 1. The opposite ends of the cylinder 2 are connected to the control valve 7 by the respective pipes 8 and 9, each of which serves alternately to impose vacuum in the end of the cylinder to which it is connected, and to replace this void by atmospheric pressure.

The middle portion of the cylinder 2 is connected to the control valve by a vacuum pipe 10. The control valve 7 is connected to a vacuum conduit 11, which is in turn, connected to a reservoir, not shown, but of conventional type which is maintained evacuated by any suitable means operating as a function of the engine.

Assuming that the right hand side of Figure 1 and of Figures 2 to 5, inclusive, are toward the bow of the boat, the control valve has a manual operating handle 12, which has the definite rightward position shown in Figures 1 and 2 when the clutch is engaged for forward travel, a definite leftward position shown in Figure 4, when the clutch is engaged for reverse travel, and a definite vertical upright position when the clutch is in neutral position, regardless of whether it has been moved to neutral from forward position, or to neutral from reverse position.

Before proceeding to a detailed explanation of the structure and phases of the control valve, it may be stated that when the clutch is engaged in forward position the piston 3 is held at the left end of the cylinder through vacuum, which at that time is imposed upon the left end of the cylinder, and by atmospheric pressure, which at that time is freely admitted to the opposite end of the cylinder. In neutral position the piston 3 occupies the mid position shown in Figures 3 and 5, the vacuum and atmospheric pressure having been cut off and the pressures having been equalized on both sides of the piston. When the clutch is engaged in the reverse direction, the piston 3 is at the right end of the cylinder, being held there by vacuum from the pipe 9, and by atmospheric pressure admitted to the opposite end of the cylinder through the pipe 8.

Referring now to Figures 2, 3, 4 and 5, it will be noted that the control valve comprises a fixed casing 13 having an interior cylinder chamber 14 with which the alternate vacuum and pressure pipes 8 and 9 and the vacuum pipe 10 communicate. Said chamber also communicates with atmosphere by means of ports 15 and 16, which respectively lie adjacent the alternate vacuum and pressure pipes 8 and 9.

Within the chamber 14 is a plug or barrel 17 to which the handle 12 is attached, said barrel having a passage 18 having an axial end 19, (see Figure 6) which is swivelly juxtaposed to the end of the vacuum conduit 11, the latter being connected coaxially to the casing 13. The passage 18 has a radial limb 20 adapted to communicate upon occasion, with either the pipes 8, 9 or 10.

The fact that the purpose of the invention requires the manual operating handle to have a definite and identical neutral position, both after forward as well as reverse drive, makes it impossible that a single movable member, such as the barrel 17, can be so ported as to make the necessary fluid pressure connections with the ports in the casing 13. If it were attempted to design the ports in the barrel 17 so as to obtain proper fluid connections between said barrel and said casing for operating the clutch, then the operating handle 12 would have one position for neutral after forward drive, and another position for neutral after reverse drive, a situation which would lead to confusion in the operation of the clutch, and which might in stress of emergency be inimical to safety in the operation of the boat. It has, therefore, been found necessary to provide an intermediate member between the barrel 17 and the casing 13 having a differential movement with respect to said barrel.

This member is the cylindrical annulus 21, the outer surface of which is a machined fit within the casing 13 and the inner surface of which makes a machined fit with the barrel 17. Said annulus has an elongated vacuum port 22, which alternatively serves one of the pipes 8, 9 and 10, and which is in constant communication with the vacuum passage 18. The vacuum port 22 is elongated for the purpose of enabling the limb 20 of the vacuum passage to be always in communication with it, regardless of the differential movement between the barrel 17 and the annulus 21, which is necessary to enable the handle 12 to always have the same position when in neutral.

The annulus 21 is also provided with the atmospheric by-passes 23 and 24, which upon occasion, connect the pipes 8 and 9 to atmosphere through the ports 15 and 16, and the annulus is further provided with the pairs of extension ports 25 and 26, which also upon occasion in cooperation with the barrel by-passes 27 and 28, connect the respective ends of the cylinder with atmosphere through the ports 15 and 16.

The annulus 21 is oscillated indirectly through the handle 12 by means of a lug 29 which is conveniently secured to the barrel 17 within the limb 20 of the vacuum passage 18, and which projects into the elongated vacuum port 22 of the annulus 21. The limits of the differential movement between the barrel 17 and annulus 21 are determined by the engagement of the lug 29 with the end walls of the port 22 when the handle 12 is moved in a forward or reverse direction, and the amplitude of this differential movement is the lost motion represented by the angular distance $a$ between the arrowheads in Figure 2. The amplitude of movement of the barrel 17 is greater than that of the differential movement between said barrel and annulus, so that after the lug 29 has engaged one or the other ends of the port 22, the annulus picks up the movement, and thereafter, both the barrel and annulus move together for a certain distance. This distance is determined by means of a pin 30, shown in Figure 6, which is fixed to the annulus 17, and which projects into a slot 31, and which in either direction of its movement engages an end of said slot, thereby limiting the movement of the annulus and with it, the movement of the barrel and the handle 12. These limits of movement are reached when the handle 12 is in its forward and reverse positions. The detent 32 imparts frictional pressure to the annulus 21 and gives the desired amount of stiffness to the operation of the valve.

The sequence of operation is as follows: Referring to Figure 5, which is the neutral after reverse position, the handle 12 is upright; both ends of the cylinder are at atmospheric pressure; and the plunger is in stable midposition, itself acting as a valve, having cut off the vacuum from the vacuum pipe 10. The handle 12 is now pushed in a clockwise direction to the position shown in Figure 2. Inasmuch as the lug 29 is against the advanced end of the elongated vacuum port 22, the barrel 17 and annulus 21 move together in a clockwise direction. The effect of this movement is to place the elongated vacuum port 22, which is always in communication with the limb 20 of the vacuum passage 18, into communication with the pipe 8 at the left end of the cylinder. At the same time the by-pass 24 connects the right hand end of the cylinder with atmosphere through the pipe 9. Vacuum is at the same time cut off from the vacuum pipe 10. Differential pressure thus produced on opposite sides of the piston 3 moves it to the leftward position shown in Figure 3, and operates the piston rod 4 to draw the clutch lever 1 toward the left, placing the clutch in forward position. Since vacuum is continuously drawn through the pipe 8 and atmospheric pressure is continuously supplied through the pipe 9 whilever the handle 12 is in forward position, the clutch will remain in forward position of engagement.

Assuming now that it is desired to go into neutral from forward position. The handle 12 in Figure 2 is moved in a counterclockwise direction to the upright position. Inasmuch as the barrel now moves in a reverse direction from that of its preceding movement, the lug 29 moves away from the end of the elongated vacuum port 22 with which it has been in engagement, and travels freely to the right through the angle $a$ which represents the excess in the length of the port 22 over the width of the lug 29. During this much of the angular movement of the handle 12 there has been no change of functioning within the cylinder 2. As soon as the lug 29 engages the right hand end of the elongated vacuum port 22, the annulus 21 begins to move with the barrel 17 in a counterclockwise direction. The first effect of this will be to cut off the vacuum from the left hand end of the cylinder 3, and to cut off the atmospheric pressure from the right hand end of said cylinder. At the same time, the port 22 begins to communicate with the vacuum pipe 10, inducing a vacuum in the cylinder 2 which draws the plunger 3 toward the right. When the plunger 3 approaches the middle of the cylinder, it begins to cut off the vacuum from the pipe 10 and by reducing the capacity of that part of the cylinder which lies to its right, the plunger has raised the pressure of the air in said cylinder so that by the time the plunger has quite cut off the vacuum from the vacuum pipe 10, the trapped air in the right hand side of the cylinder is substantially at atmospheric pressure. In the meantime, the by-pass 27 has placed the left end of the cylinder into communication with atmosphere. Thus, static conditions exist on opposite sides of the plunger when it is in the neutral position shown in Figure 3.

Now, there are two directions in which the handle 12 may be moved from neutral position. It can be either moved back into forward position, in which case as will readily appear from Figure 3, the lost motion will first be taken up between the barrel and the annulus before the valve begins to effect change of functions in the cylinder 2. The parts will then move back into the position shown in Figure 2. The other direction in which the handle 12 might be moved from neutral is into reverse position. This is shown in Figure 4. When the neutral after forward position, the lug 29 is against the right hand end of the vacuum port 22. When the lever is thrown in a counterclockwise direction, as shown in Figure 4, the barrel and annulus move together throughout the entire amplitude of movement of the handle 12. This reverses the functions which attend the position of the part shown in Figure 2, so that vacuum is admitted to the right hand end of the cylinder and atmospheric pressure to the left hand end, moving the plunger 3 to the right, and throwing the clutch lever 1 into its reverse position. From the above it will be apparent that I have provided a vacuum system for positively engaging the clutch in opposite positions, said system being controlled by a valve, the operating handle of which has definite forward and reverse positions and an intermediate neutral position which is identical both for neutral after forward and neutral after reverse, and in which the handle is operated by a single swing in the direction in which it is desired to have the boat travel, or into neutral position.

Figure 1 shows additionally, a means for correlating the engine throttle with the clutch operating mechanism whereby the engine has automatically slowed down when operating the clutch. The means diagrammatically shown comprises a pair of cams 33 and 34 on the external portion of the piston rod 4 movable into the path of a reciprocatory link 35 connected to the throttle lever 36. Figure 1 shows the link 35 in downward position in a trough 37 adjacent the cam 34. This represents a high speed position of the throttle lever 36. When the piston 3 is changing from forward to neutral position, the link 35 rides up upon the cam 34, slowing the motor. When the piston 3 is in neutral position the link 35 drops into the trough 38. This makes possible a high speed of the motor which may be desirable in warming up a cold engine, and the speed of which may be at that time manually controlled. When the plunger 3 is passing from neutral to reverse, the link 35 rides upon the cam 33, slowing the engine, and when the piston 3 is in reverse position at the right of the cylinder 2, the link 35 is in the trough 39 permitting an accelerated speed of the engine.

Figure 1 shows also an expedient for preventing slipping or "riding" the clutch. In a boat, the power plant and the cylinder 2 may be mounted upon different parts of the hull so that through weaving or other movements of the hull due to the crests and troughs of the waves the distance between the cylinder 2 and the power plant may fluctuate a few hundredths of an inch from time to time. If the piston rod 4 and the linkage which connects it to the clutch lever 1 were of invariable length and all the time connected, this fluctuation might cause slight movement of the clutch lever 1, which would cause slipping of the clutch. To prevent this, means is provided for automatically breaking the connection between the piston rod 4 and the clutch lever 1 when the clutch is in forward drive position. This means comprises a dog or pawl 40 pivotally mounted on the link 5 and engageable with a notch 41 on the link 6. When so engaged, the piston rod, link 5 and link 6 are a continuous unit. The dog 40 is provided with a trip 42 engageable with a fixed stop 43 so that when the piston 3 pulls the linkage in the forward direction the trip 42 engages the stop 43 after the clutch lever 1 has been moved to forward and breaks the connection. Automatically, when the piston 3 moves to neutral position, the dog 40 comes down into place in the notch 41 and the linkage is reconnected.

While I have in the above description disclosed what I believe to be a preferred and practical embodiment of my invention, it will be understood to those skilled in the art that the details of construction and the arrangement of parts as illustrated and described, as by way of example, and not to be construed as limiting the scope of the invention.

What I claim as my invention is:

1. In a vacuum system for moving a clutch element positively in opposite directions, of that type in which the moving instrumentality is a piston in a cylinder having extreme positions corresponding to forward and reverse engagement positions of the clutch, and a mean position corresponding to the neutral position of the clutch, and wherein the cylinder has conduits at the ends each communicable with a source of vacuum and with atmosphere, and a conduit in the middle communicable with a source of vacuum, the piston acting as a valve to close the middle conduit when the piston is in its midposition, the combination with the cylinder and conduits of a control valve therefor comprising essentially a central barrel, an annulus seated coaxially about said barrel, and a casing having a cylindrical chamber, coaxially seating about said annulus, said barrel having a passage connected to a source of vacuum, and said casing having passages connected to said end and middle conduits, said barrel being oscillatable relative to said annulus through an arc the amplitude of which is limited by the engagement of means on said barrel with stops on said annulus, and said annulus being oscillatable through an arc the amplitude of which is greater than that of said barrel relative to said annulus, and limited by means on said annulus engageable with stops on said casing, said annulus being movable to the limits of its arc of oscillation by said barrel through the engagement of the said means on the latter with either of the stops on the former, a handle on said barrel for operating said valve, said barrel, annulus and casing having a correlated system of ports for causing the piston to perform its clutch operating movements through selective movements of the valve handle, said system of ports including an elongated port in said annulus always in communication with the vacuum passage of said barrel, and movable with said annulus selectively to register with either of said end conduits or said middle conduit, said handle having definite forward and reverse positions determined by the limits of the arc of oscillation of said annulus, and an intermediate neutral position which is identical whether the handle is moved to it from forward or reverse positions.

2. In a vacuum system for moving a clutch element positively in opposite directions, of that type in which the moving instrumentality is a piston in a cylinder having extreme positions corresponding to forward and reverse engagement positions of the clutch, and a mean position which corresponds to the neutral position of the clutch; and wherein the cylinder has conduits at the ends each communicable with a source of vacuum and with atmosphere, and a conduit in the middle communicable with a source of vacuum, the piston acting as a valve to close the middle conduit when said piston is in its midposition, the combination with said cylinder and conduits of a control valve therefor comprising essentially a central barrel, an annulus seated coaxially about said barrel, and a casing having a cylindrical chamber, coaxially seating about said annulus, said barrel having a passage connected to a source of vacuum terminating radially of said barrel, said casing having passages connected to said end conduits and to said middle conduit, a handle on said barrel for operating said valve, said barrel, annulus and casing having a correlated system of ports for causing the piston to perform its clutch operating movements through selective movements of the valve handle, including an elongated port in said annulus always in communication with the vacuum passage of said barrel, and movable with said annulus selectively to register with either of said end conduits or said middle conduit, said barrel being oscillatable through an arc relative to said annulus, a lug projecting from said barrel at the end of the radial end of said passage into the elongated port of said annulus, engageable with the end walls of said port to limit the amplitude of relative oscillation between said barrel and annulus, said annulus being oscillatable through an arc the amplitude of which is greater than that of said barrel relative to said annulus, and limited by means on said annulus engageable with stops on said casing, said annulus being movable to the limit of its arc of oscillation, by said barrel through the engagement of said lug with either of the end walls of said elongated port, said handle having definite forward and reverse positions determined by the limits of the arc of oscillation of said annulus, and an intermediate neutral position which is identical whether the handle is moved to it from forward or reverse positions.

3. In a vacuum system for moving a clutch element positively in opposite directions, of that type in which the moving instrumentality is a piston in a cylinder having extreme positions corresponding to forward and reverse engagement positions of the clutch, and a mean position which corresponds to the neutral position of the clutch, and wherein the cylinder has conduits at the ends each communicable with a source of vacuum and with atmosphere, and a conduit in the middle communicable with a source of vacuum, the piston acting as a valve to close the middle conduit when the piston is in its midposition, the combination with said cylinder and conduits of a control valve therefor comprising essentially a central barrel, an annulus seated coaxially about said barrel, and a casing having a cylindrical chamber, coaxially seating about said annulus, said barrel being oscillatable through an arc relative to said annulus the amplitude of which is limited by the engagement of means on said barrel with stops on said annulus, and said annulus being oscillatable through an arc the amplitude of which is greater than that of said barrel relative to said annulus, and limited by means on said annulus engageable with stops on said casing, said annulus being movable to the limits of its arc of oscillation by said barrel through the engagement of the said means on the latter with either of the said stops on the former, said barrel having a passage connected to a source of vacuum, said casing having passages connected to said end conduits and to said middle conduit, and having ports open to atmosphere, said annulus and barrel having ports at times connecting said end pipes with atmosphere and at times cutting them off from atmosphere, said annulus having an elongated port always in communication with the vacuum passage of said barrel and communicable selectively with said middle and end conduits, said annulus being provided also with atmospheric by-passes arranged to place one or the other of said end conduits in communication with atmosphere and simultaneously placing the other end in communication with said elongated vacuum port, a handle on said barrel for operating said valve having definite forward and reverse positions determined by the limits of the arc of oscillation of said annulus, and an intermediate neutral position which is identical whether the handle is moved to it from forward or reverse positions.

4. In a marine power plant including a clutch positively operated in opposite directions for engaging it for forward and reverse travel, a vacuum system for operating said clutch including a cylinder operably connected to a source of vacuum, a piston in said cylinder, and a control valve, said piston having a piston rod operatively connected to said clutch, and means for automatically breaking the continuity of the connection between said piston rod and clutch when the clutch is in forwardly engaged position, said means reestablishing the connection between said piston rod and clutch upon the initial part of the movement of said piston rod in a direction to cause the disengagement of said clutch from forward drive position.

JOSEPH J. DUGAS, Jr.